No. 820,595. PATENTED MAY 15, 1906.
O. NORTON.
QUAHOG RAKE.
APPLICATION FILED SEPT. 18, 1905.
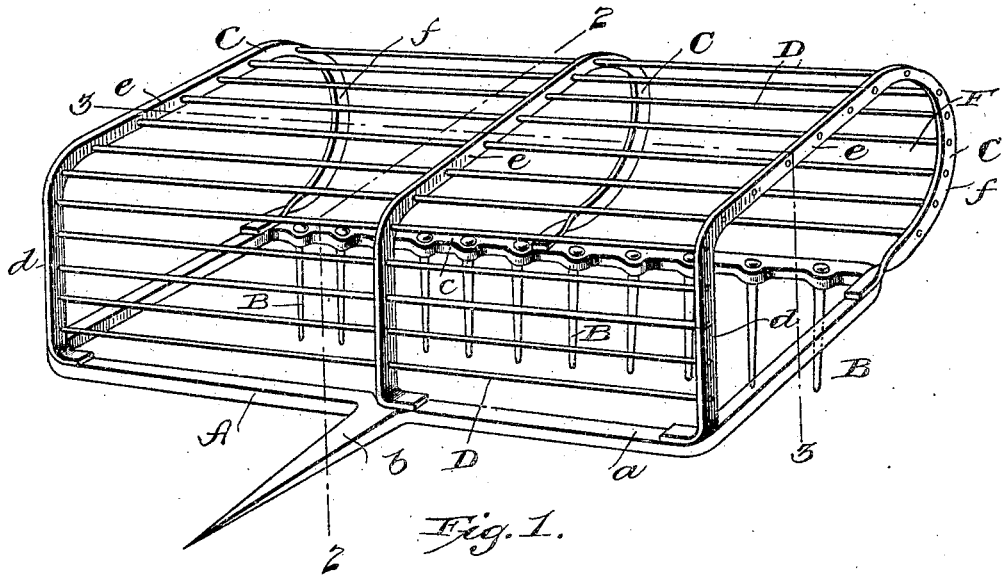
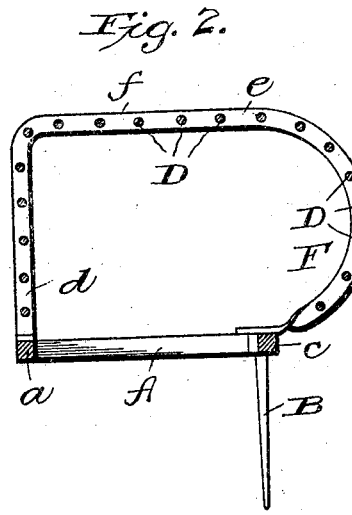 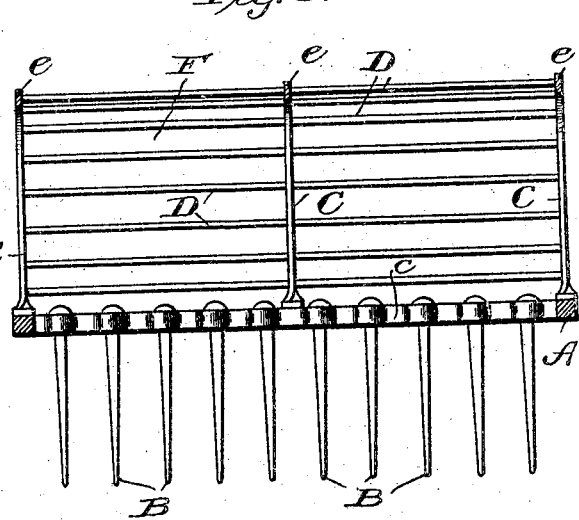
Witnesses
P. L. Mockabee
James F. Crown
Inventor
Orin Norton.
By William D. Deane,
his Attorney

UNITED STATES PATENT OFFICE.

ORIN NORTON, OF EDGARTOWN, MASSACHUSETTS.

QUAHOG-RAKE.

No. 820,595.　　　Specification of Letters Patent.　　　Patented May 15, 1906.

Application filed September 18, 1905. Serial No. 278,959.

*To all whom it may concern:*

Be it known that I, ORIN NORTON, a citizen of the United States, residing at Edgartown, in the county of Dukes and State of Massachusetts, have invented certain new and useful Improvements in Quahog-Rakes, of which the following is a specification.

My invention has reference to rakes for taking oysters, clams, and the like; and it contemplates the provision of a simple, inexpensive, and efficient rake designed more especially for gathering the species of clams known as "quahogs."

The invention will be fully understood from the following description when the same is considered in connection with the accompanying drawings, forming part of this specification, in which—

Figure 1 is a perspective view of my novel quahog-rake. Fig. 2 is a section taken in the plane indicated by the line 2 2 of Fig. 1, and Fig. 3 is a section taken at right angles to Fig. 2 and in a plane slightly in rear of the frame-bar by which the rake-teeth are carried.

Similar letters designate corresponding parts in all of the views of the drawings, referring to which—

A is the main frame of my novel rake. The said main frame is made of wrought-iron or other suitable material and is rectangular in form and provided at the middle of its rear bar $a$ with a shank $b$ for the connection of a handle. (Not shown.)

B B are teeth fixedly connected to the forward bar $c$ of the frame A at intervals in the length thereof and depending from said bar.

C C C are metallic straps riveted or otherwise fixed at their ends to the rear bar $a$ and forward bar $c$ of the frame A, and D D are metallic rods extending between and connected to the said straps C at intervals in the length of the latter and forming with the same a cage. The straps C respectively comprise a rear portion $d$, extending upwardly from and disposed at right angles to the rear frame-bar $a$, a top portion $e$, extending forwardly from the said rear portion $d$, and a forward portion $f$, curved forwardly from the said top portion $e$ and extending to the forward frame-bar $c$. From this it follows that the forward portions of the straps C, in connection with the rods D, form a pocket F, disposed above and in front of the teeth B and open at its rear side. This pocket F has for its function to receive and hold the quahogs as the same are engaged and taken up by the teeth B.

In the practical use of my novel rake the same is moved to and fro over the bed bearing quahogs, when, as before stated, the quahogs engaged by the teeth B will be received and held in the pocket F. When the said pocket is filled, the rake is discharged of its contents and the operation described is repeated.

It will be apparent from the foregoing that I have provided a quahog-rake which is at once simple, inexpensive, and efficient, and it will also be noticed that the construction of the rake is such that the same is well adapted to withstand the rough usage to which quahog-rakes and the like are ordinarily subjected.

Having thus described my invention, what is claimed, and desired to be secured by Letters Patent, is—

1. A rake for the purpose described comprising a foraminous frame in the form of a cage, a forward bar arranged at the bottom of said cage and having teeth depending therefrom, and a rigid pocket formed integral with said cage extending forwardly beyond the forward bar and open at its rear side.

2. In a rake for the purpose described, the combination of a rectangular main frame, teeth depending from the forward bar of the main frame, and a cage arranged directly over the said main frame and having a rigid pocket extending forwardly beyond the forward bar of the main frame and open at its rear side.

3. In a rake for the purpose described, the combination of a rectangular main frame, teeth carried by and depending from the forward bar of said frame, and a cage arranged on and connected to the main frame and having a pocket extending forwardly beyond the forward bar of the frame and open at its rear side; the said frame comprising metallic straps fixedly connected at their ends to the rear and forward bars of the main frame, and rods extending between and connected to the said straps.

In testimony whereof I affix my signature in presence of two witnesses.

ORIN NORTON.

Witnesses:
JONA H. MUNROE,
BERIAH T. HILLMAN.